Oct. 18, 1955

Z. N. MERETEY 2,721,043

PLASTIC SPINNING CONE

Filed April 15, 1952

INVENTOR
ZOLTAN MERETEY

BY

J. P. Hetherill

ATTORNEY

United States Patent Office 2,721,043
Patented Oct. 18, 1955

2,721,043

PLASTIC SPINNING CONE

Zoltan N. Meretey, Stamford, Conn., assignor to PM Industries, Incorporated, Stamford, Conn.

Application April 15, 1952, Serial No. 282,335

2 Claims. (Cl. 242—122)

This invention relates to a cone or spindle to receive and hold thread and refers more particularly to such a cone or spindle having a body formed of a plastic composition characterised by a specific surface texture.

It is an object of this invention to produce cones of various types and shapes depending upon the kind of thread that is to be wound and stored on the particular cone or spindle.

It is another object of this invention to produce a cone of the maximum strength having the characteristic surface texture.

It is still another object of this invention to treat the cone to have a characteristic surface which is soft and resilient so that it will hold the thread without slipping or crushing the same.

It is still another object of this invention to so process the treated surface as to give it a characteristic color which allows ready identification of the thread stored on the cone. The cone or spindle is transfer-molded or otherwise formed from a plastic composition containing a fiber filler to produce a hollow article.

This article is then treated in accordance with the disclosure of my copending application Serial No. 268,119, filed January 24, 1952.

The fiber filler may be of cotton flock, cotton rag filler, wood flour, wool fiber or synthetic fiber filler, or any other material such that, when it is treated in accordance with my process, that the exposed surface will have a rough or soft resilient character necessary to receive and hold thread, of cotton, silk, wool or that made from synthetic fiber. The preferred material is cotton flock, although wood flour gives very satisfactory results.

The type of resin that is used in producing the cones is a thermo-setting resin containing a rubber of either the natural or synthetic type. The preferred material contains butadiene copolymerized with a phenol formaldehyde resin wherein the rubber or rubber-like material is in an amount up to 17%. This polymer is cotton flock filled.

It is contemplated that cones of various types may be made in accordance with this invention. The type of cones usually found in the industry are 9°, 36 minutes, 6° cones and 3° cones. The first and the last cone are in most common use, the first cone being used to hold natural fiber threads, such as cotton, wool, flock, and the last cone is the cone most generally being used for holding synthetic fiber thread, such as rayon, nylon, Orlon, etc.

As an example of the cone or spindles contemplated by this invention, a 9°, 36 minute cone will be described. However, this invention is not to be limited to this particular cone and is applicable equally as well to other types of cones or spindles made from a synthetic resin and a fiber filler wherein the synthetic resin contains a rubber or rubber-like material. The new material introduced by this invention has led to certain modifications from the usual cone design, and these modifications are a part of this invention.

Referring to the drawings.

Figure 1:
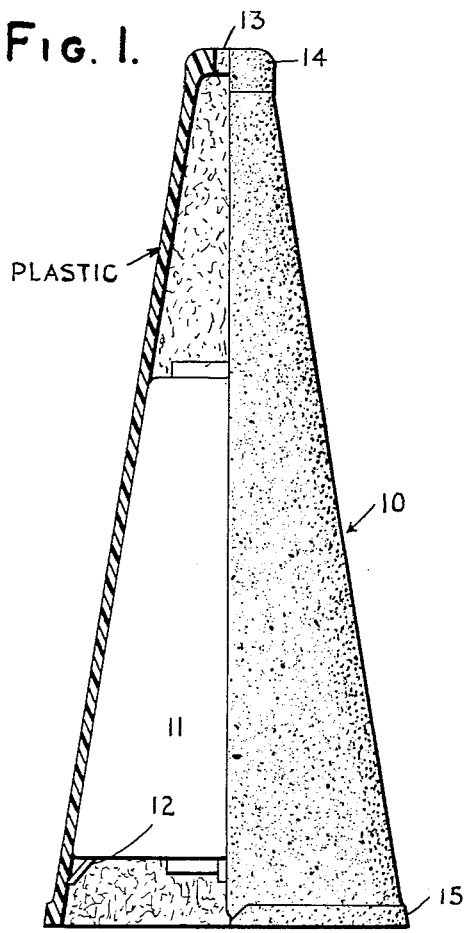
Figure 1 is a horizontal view of one form of the cone as molded in partial cross-section.

Figure 1 shows a cone 10 mounted on a rotating form 11, held in position by means of the dog 12. This 90°, 36 minute cone is molded from a plastic composition containing a rubber of either the natural or synthetic type with a fiber filler.

An example of the composition from which this cone may be molded is a copolymer of 83% phenol formaldehyde condensation product molded with 17% of a butadiene synthetic rubber and filled with cotton flock.

Another example of the composition from which this cone may be molded is resin composed of 92% phenol formaldehyde and 8% of a butadiene synthetic resin and wood flour filled.

Still another example of the composition from which this cone may be molded is a copolymer of 96% phenol formaldehyde condensation product and 4% of a butadiene synthetic resin.

Figure 3:
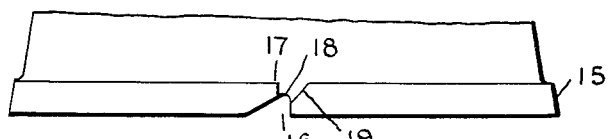
Fig. 3 is an enlarged view of the base of the cone as shown in Fig. 1.
Figure 4:
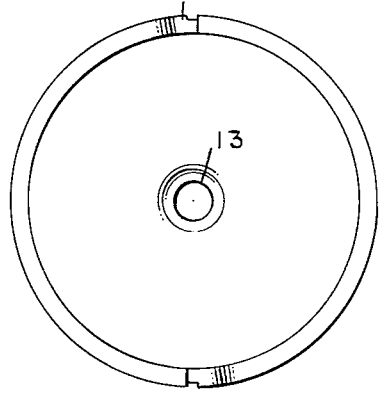
Fig. 4 is a horizontal view of the finished cone, as shown in Fig. 1.

These cones are molded with an opening 13 at the small end thereof which will allow the liquid contact when treated, as described in my copending application referred to above. It is noted that there is a slight thickening of the body of the cone, shown in Figure 1, at the apex and producing a ridge 14. There is also a rim or thickened portion 15 at the large end of this cone with two notches cut therein as shown at 16 in Figure 3. This notch is made with a vertical side 17 cut through the body of the cone to allow the notch to have the sloping side 19. This cone will rotate in a counter-clockwise manner, the end of the thread is placed in the interior part of the cone before it is placed on the rotating form 11 or 11', and held between the body of the cone and the form. It is then fed through the notch and back toward the right hand side of the cone which rotates in a counterclockwise direction. It will feed the thread on to the cone with the least possible chance of breaking the thread at the notch 16, or of cutting the thread at this point by the action of the feed roller. It will be noted that these notches, for convenience, are placed directly opposite each other in the rim at the base of the cone. The rim at both ends of the cone allows the first few turns of the thread to feed on the cone without contacting the rotating cylinder against which the cone is forced during the winding action, and therefore prevents the crushing of the thread at this point. The soft, resilient or rough surface produced on this cone by exposing the filler on which the thread is fed on to the cone prevents the thread from slipping and at the same time gives a cushioning effect that aids in the prevention of the crushing of the thread. The cones after treatment are characterised by the exposure of the filler which gives a surface having a controlled resiliency. This is controlled insofar as the length of the exposed filler is predetermined by etching more or less of the plastic base.

Figure 2:
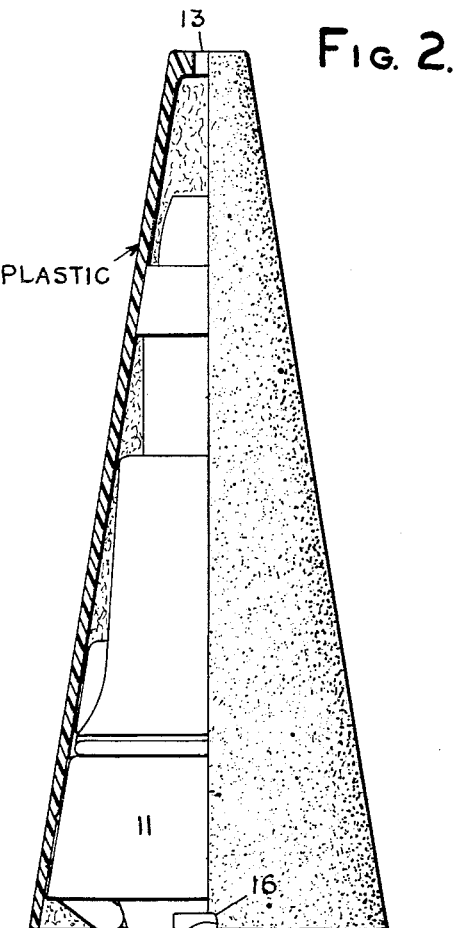
Fig. 2 is a horizontal view of another form of the cone in partial cross section.

The cone shown in Figure 2 differs from that shown in Figure 1 and represents a second embodiment of the invention and comprises a straight sided cone or spindle without the reinforcing at the ends. The hole 13 at the apex of the cone will allow the contact of the liquid during the etching treatment thereof. The cone also has two notches 16 in the base thereof. This cone due to its characteristic surface will contact the thread and hold it without crushing during the winding operation.

Paper cones heretofore in use have only been capable of being used for a comparatively few number of times, that is five or less. Usually they are a single use item and are discarded after the first use. The plastic cones produced by this invention on the other hand, have great resistance to mechanical damage and as a result have been able to be used several hundreds of times before being discarded.

After the cone has been molded and treated by the process referred to above so as to expose the fiber from the filler, these fibers may be bleached, using the usual chlorine bleach to remove the color therefrom. The cones in this condition, if the cotton flock filler is used, may then be dyed to give a characteristic color, using any of the dyes that are usually used to dye cotton. If other types of fillers are used it will be necessary to use the dyes that are commonly used to dye these fabrics. Such cones will then be colored red, blue, green, etc., which colors are used to identify the threads stored on the cones.

While the above examples of plastic cones having a characteristic filler are given, it is only for the purpose of illustration, and the invention should not be limited to this modification. Spindles may be produced by this process as well as cones, and cones of other forms than those described may also be produced, as fall within the scope of the appended claims.

What is claimed is:

1. A textile cone having a rigid, thin, plastic body, said cone having a large end and a small end, said small end being of greater diameter than the continuous cone surface, said large end having a rim extending above the cone surface, said small end and said rim being above the surface at least an amount equal to the diameter of the thread which is to be put on the cone, the said large end having at least one axial notch cut therein, the lead edge of this notch being cut at an angle and the trailing edge being cut vertically, said rim being discontinued at the said notch to allow the thread access therethrough.

2. A cone as claimed in claim 1, wherein the thin plastic body is composed of a thermo-plastic material containing a rubber-like material.

References Cited in the file of this patent

UNITED STATES PATENTS

| | | |
|---|---|---|
| 678,540 | Chase | July 16, 1901 |
| 1,204,517 | Steinacker | Nov. 14, 1916 |
| 1,713,746 | Dennison | May 21, 1929 |
| 1,993,143 | Jones | Mar. 5, 1935 |
| 2,076,451 | Fallscheer | Apr. 6, 1937 |
| 2,219,836 | Dunlap | Oct. 26, 1940 |
| 2,429,431 | Sloan | Oct. 21, 1947 |
| 2,432,270 | Asbill | Dec. 9, 1947 |
| 2,484,756 | Snow | Oct. 11, 1949 |
| 2,605,979 | Gartrell | Aug. 5, 1952 |
| 2,666,693 | Meretey | Jan. 19, 1954 |

FOREIGN PATENTS

| | | |
|---|---|---|
| 885 | Great Britain | Mar. 5, 1879 |
| 640,141 | France | Mar. 24, 1928 |
| 499,138 | Great Britain | Jan. 16, 1939 |